United States Patent
Xiong (10) Patent No.: US 10,362,644 B1
(45) Date of Patent: Jul. 23, 2019

(54) FLYBACK CONVERTER WITH LOAD CONDITION CONTROL CIRCUIT

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/032,143

(22) Filed: Jul. 11, 2018

Related U.S. Application Data (60) Provisional application No. 62/538,007, filed on Jul. 28, 2017.

(51) Int. Cl.
*H02M 3/335* (2006.01)
*H05B 33/08* (2006.01)
*H02M 1/08* (2006.01)

(52) U.S. Cl.
CPC .......... *H05B 33/0815* (2013.01); *H02M 1/08* (2013.01); *H02M 3/33523* (2013.01)

(58) Field of Classification Search
CPC .... H02M 1/08; H02M 3/335; H02M 3/33507; H02M 3/33523; H05B 39/02; H05B 39/04047
See application file for complete search history.

(56) References Cited

U.S. PATENT DOCUMENTS

| | | | |
|---|---|---|---|
| 6,349,045 B1 | 2/2002 | Kögel et al. | |
| 6,577,512 B2 | 6/2003 | Tripathi et al. | |
| 6,775,164 B2 | 8/2004 | Wong et al. | |
| 7,233,258 B1 | 6/2007 | Gelinas | |
| 8,193,738 B2 | 6/2012 | Chu et al. | |
| 8,344,638 B2 | 1/2013 | Shteynberg et al. | |
| 8,698,849 B2 | 4/2014 | Woo et al. | |
| 8,803,437 B2 | 8/2014 | Hsieh | |
| 8,884,541 B2 | 11/2014 | Wu | |
| 9,577,540 B1* | 2/2017 | Xiong | H02M 3/3353 |
| 9,780,638 B2 | 10/2017 | Simi | |
| 9,917,524 B2 | 3/2018 | Fang et al. | |
| RE47,031 E * | 9/2018 | Morong | H02M 3/33523 |
| 10,128,740 B1* | 11/2018 | Xiong | H02M 1/15 |
| 2004/0003301 A1 | 1/2004 | Nguyen | |
| 2009/0315480 A1* | 12/2009 | Yan | H05B 33/0815 315/297 |

(Continued)

*Primary Examiner* — Jason Crawford (74) *Attorney, Agent, or Firm* — Patterson Intellectual Property Law, P.C.; Gary L. Montle; Alex H. Huffstutter (57) ABSTRACT

A driver circuit includes a load control circuit for supplementing a light emitting diode (LED) load in a low load condition. The low load condition corresponds to an output voltage across the LED load below a predetermined threshold voltage. The driver circuit includes an isolation transformer. A primary side circuit is coupled to a primary winding of the isolation transformer and includes a constant current control integrated circuit (IC) and a switch. The constant current control IC controls an output current to the LED load. A load control circuit is coupled to across the LED load and includes an auxiliary load which ensures that the isolation transformer operates in a continuous mode. The auxiliary load supplements the LED load with in a low load condition, but not in a high load condition. The auxiliary load may be configured to quickly discharge an output capacitor in a power off condition.

14 Claims, 4 Drawing Sheets

(56) References Cited

U.S. PATENT DOCUMENTS

| | | | |
|---|---|---|---|
| 2011/0157936 A1* | 6/2011 | Huynh | H02M 3/33507 |
| | | | 363/78 |
| 2011/0199793 A1* | 8/2011 | Kuang | H05B 33/0815 |
| | | | 363/21.13 |
| 2012/0298890 A1 | 11/2012 | Adiga-Manoor et al. | |
| 2012/0314456 A1 | 12/2012 | Lanni | |
| 2012/0319621 A1* | 12/2012 | Sutardja | H05B 33/0815 |
| | | | 315/307 |
| 2013/0064566 A1* | 3/2013 | Kojima | H02M 3/33523 |
| | | | 399/88 |
| 2013/0099691 A1* | 4/2013 | Esaki | H05B 33/0815 |
| | | | 315/210 |
| 2013/0107585 A1* | 5/2013 | Sims | H02M 3/33592 |
| | | | 363/21.14 |
| 2014/0098579 A1* | 4/2014 | Kleinpenning | H02M 3/33523 |
| | | | 363/21.17 |
| 2014/0140107 A1* | 5/2014 | Chen | H02M 3/33523 |
| | | | 363/21.15 |
| 2014/0232270 A1* | 8/2014 | Kimura | H04B 33/0815 |
| | | | 315/122 |
| 2015/0271882 A1 | 9/2015 | Melanson et al. | |
| 2016/0164420 A1* | 6/2016 | Kong | H02M 3/33523 |
| | | | 363/21.16 |
| 2016/0322834 A1 | 11/2016 | Carpenter, Jr. et al. | |
| 2016/0373011 A1* | 12/2016 | Kawashima | H02M 3/33507 |
| 2017/0208660 A1* | 7/2017 | Hilgers | H05B 33/0845 |
| 2017/0231045 A1 | 8/2017 | Hu et al. | |
| 2017/0346411 A1* | 11/2017 | Yao | H02M 3/33576 |

\* cited by examiner

FLYBACK CONVERTER WITH LOAD CONDITION CONTROL CIRCUIT

CROSS-REFERENCES TO RELATED APPLICATIONS

This application claims benefit of U.S. Provisional Patent Application No. 62/538,007 filed Jul. 28, 2017, entitled "Flyback Converter With Load Condition Control Circuit," and which is incorporated by reference herein.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to load and voltage control in flyback converters. More particularly, the present invention relates to combined load and voltage control for a light emitting diode (LED) driver, a driver circuit implementing combined load and voltage control for an LED driver, and an LED fixture implementing the same.

BACKGROUND

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. Typically, the secondary of an LED lighting device must be electrically isolated from the primary (line and neutral side) of the lighting device to meet applicable safety standards (e.g., IEC class II isolation). In addition, an LED driver circuit should have a high power factor and should have a constant current control.

Figure 1:
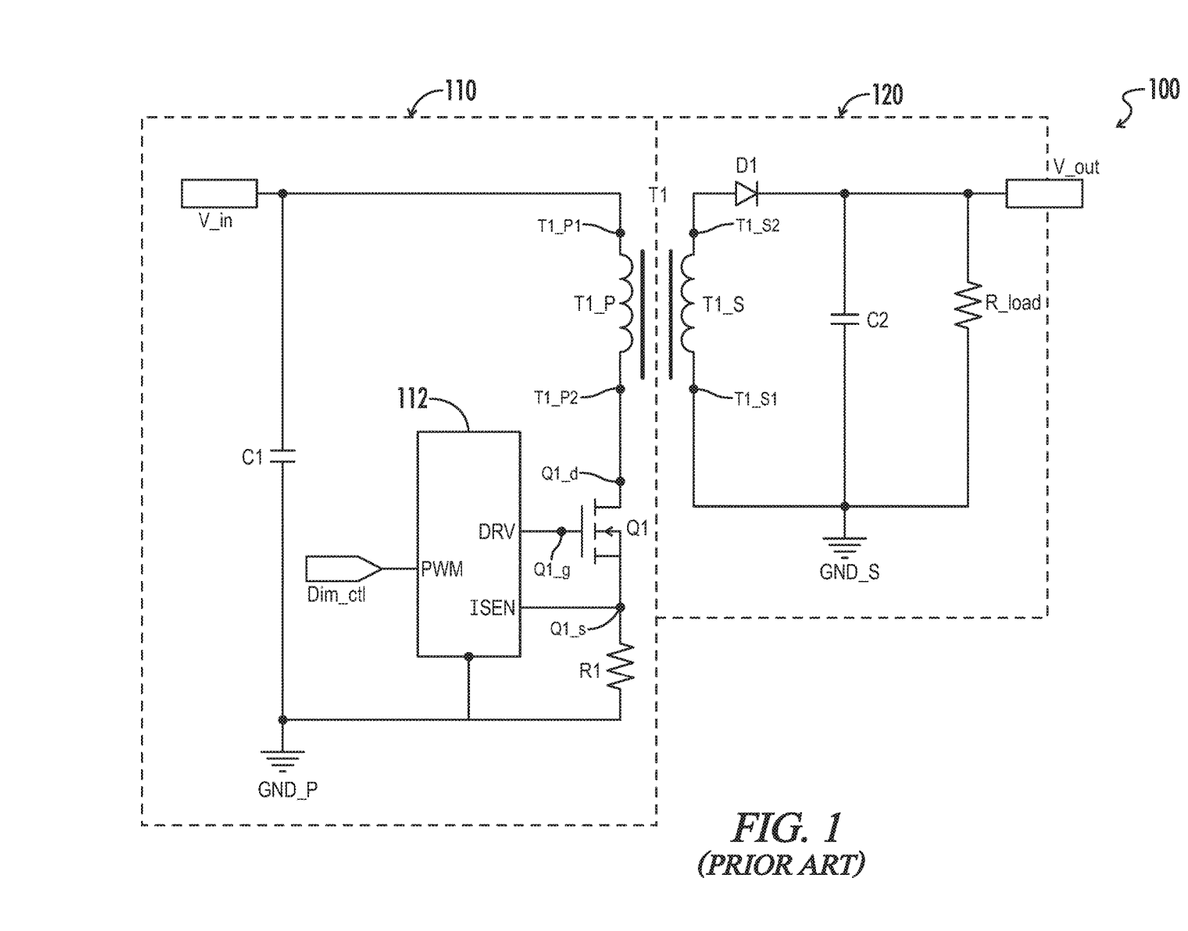
FIG. 1 illustrates a traditional flyback converter configuration having separate voltage and current control loops.

One known solution to the foregoing requirements is to use a flyback converter, as shown in FIG. 1, to produce the DC in the secondary from the primary source. The flyback converter in many known configurations provides power factor correction to produce a high power factor, and provides isolation between the primary and secondary circuits. By using primary current sensing techniques to control the secondary current through the LEDs, the flyback converter provides an LED driver that is low in cost when compared with other topologies.

However, there is at least one known drawback for the conventional flyback converter. When the load and dimming range is wide, the flyback converter will typically work between a continuous mode and a pulsing mode (shown in FIG. 2 and FIG. 3). The main reason for this phenomenon is that when the output power is too small, the duty ratio becomes very small and the operating frequency becomes very large.

Unfortunately, in LED driver applications the pulsing mode is highly undesirable because an LED load is very sensitive to variations in the voltage, and as a result the LEDs might flicker.

An exemplary isolated LED driver 100 includes a primary side circuit 110 and a secondary side circuit 120. The exemplary LED driver 100 as further discussed herein may be referred to as a flyback converter 100. In the flyback converter 100 of FIG. 1, a load R_load (i.e., array of one or more LEDs, arranged in series and/or in parallel) is located on the secondary side circuit 120 with secondary ground GND_S. The primary side circuit 110 has its own ground, primary ground GND_P. An input voltage V_in could be provided either from an input rectifier such as a diode bridge (not shown) or from a power factor correction circuit (not shown) output. Accordingly, the input voltage V_in is generally characterized herein as a DC voltage supply.

As shown in FIG. 1, the LED driver may include a transformer T1. The transformer T1 includes a primary winding T1_P and a secondary winding T1_S. Transformer T1 may be a flyback transformer as is conventionally known in the art to help provide class II isolation and to provide power conversion. The primary winding T1_P includes a first primary side terminal T1_P1 and a second primary side terminal T1_P2. The secondary winding T1_S includes a first secondary side terminal T1_S1 and a second secondary side terminal T1_S2.

The primary side circuit 110 of the LED driver 100 includes one or more of: the input voltage V_in, the primary winding T1_P, a first capacitor C1, a constant current control integrated circuit (IC) 112, a first switching element Q1, and a first resistor R1.

The input voltage V_in may be coupled with the first primary side terminal T1_P1 of the primary winding T1_P. The first capacitor C1 may be coupled between the input voltage V_in and the primary ground GND_P. The first capacitor C1 may be used as a filtering capacitor C1. The first switching element Q1 may be referred to as a first switch Q1. The first switch Q1 includes a drain node Q1_d, a gate node Q1_g, and a source node Q1_s. The constant current control integrated circuit (IC) 112 (e.g., an SY5801 device as provided by Silergy Company) may include a DVR (gate driver signal output) pin, a PWM (dimming control input) pin, and an ISEN (primary current sensing) pin. The constant current control IC 112 may be used to control the first switching element Q1 by coupling the DVR pin to the gate node Q1_g of the first switch Q1. The PWM pin of the constant current control IC 112 may be coupled to a dimming control input Dim_ctl. The dimming control input Dim_ctl may for example be provided from a wired or wireless external dimming device and typically gives a reference output current level, wherein the constant current control IC 112 adjusts the operating frequency and duty ratio according to an internal algorithm to maintain a constant output current on the secondary side circuit 120.

The second primary side terminal T1_P2 of the primary winding T1_P may be coupled to the drain node Q1_d of the first switch Q1. The first resistor R1 may be coupled between the source node Q1_s and the primary ground GND_P. The first resistor R1 may be a current sensing resistor R1. The ISEN pin of the constant current control IC 112 may be coupled to at least one side of the first resistor R1, and the constant current control IC 112 is further coupled to the primary ground. The constant current control IC 112 uses a primary sensing technique to sense the primary current going through the switching element Q1 and control the current going through the load R_load of the secondary side circuit 120. The constant current control IC 112 controls the switch Q1 to force the input current received at the secondary side 120 to follow the input voltage V1 waveform to achieve a high power factor while maintaining target output current and voltage settings in response to the dimming control input Dim_ctl.

The secondary side circuit 120 of the illustrated exemplary LED driver 100 includes a first diode D1, a second capacitor C2, and the load R_load. The second capacitor C2 may be referred to as an output buffer capacitor C2. The first secondary side terminal T1_S1 of the secondary winding T1_S may be coupled to the secondary ground GND_S. The second secondary side terminal T1_S2 of the secondary winding T1_S may be coupled to the anode of the first diode D1. The second capacitor C2 may be coupled between the cathode of the first diode D1 and the secondary ground GND_S. The first diode D1 may be a rectifier diode D1 configured to allow the energy from the secondary winding T1_S of the transformer T1 to charge the first second capacitor C2 when the first switch Q1 is off. The load R_load may be coupled in parallel with the second capacitor C2 between the cathode of the first diode D1 and the secondary ground GND_S. An output voltage V_out may be measured across the load R_load.

Figure 2:
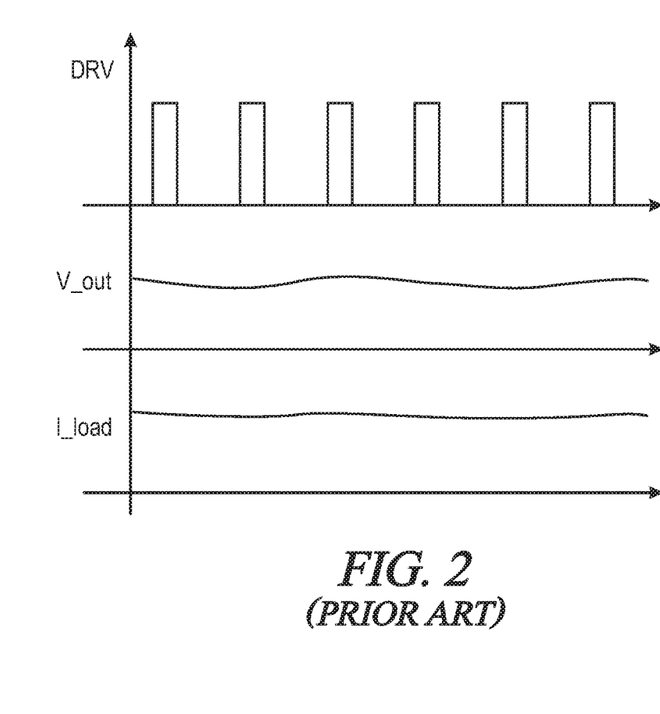
FIG. 2 illustrates the time-varying current, voltage and gate drive signal provided by the flyback converter circuit of FIG. 1 when operating in a continuous mode.

As shown in FIG. 2, when the load R_load is moderate to heavy, the transformer T1 of the LED driver 100 will work in a continuous mode. In the continuous mode, the signal from the DRV pin is continuous. As a result, the second C2 will get charged up in a regular pattern which keeps ripple voltage small enough to not cause any big ripple current through the load.

Figure 3:
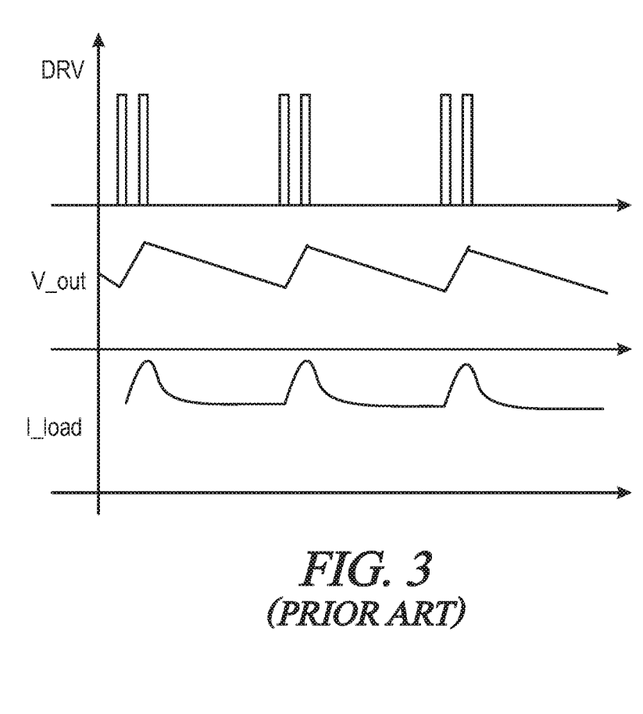
FIG. 3 illustrates the time-varying current, voltage and gate drive signal provided by the flyback converter circuit of FIG. 1 when operating in a pulsing mode.

As shown in FIG. 3, when the load R_load is light (i.e., the load is small, due for example to a highly dimmed LED output) the transformer T1 of the LED driver 100 will work in a pulsing mode. The transformer T1 pulses due to a high operating frequency combined with a small duty ratio. As shown in FIG. 3, the signal from the DRV pin of the constant current control IC 112 starts to pulse as a result of the second capacitor C1 getting charged up periodically, which causes a relatively large ripple voltage on the second capacitor C2. The large ripple voltage causes even larger current ripple through the load R_load, which leads to flickering of the load R_load. One of skill in the art may appreciate that flickering is typically not acceptable for LED lighting applications.

BRIEF SUMMARY

Accordingly, it is desirable to keep the flyback converter in an LED driver or equivalent device operating in the continuous mode (or eliminate the pulsing mode) to avoid flickering of the load R_load. Also, it would be desirable to discharge the output buffer capacitor C2 quickly whenever the input of the flyback converter 100 is turned off so that the flyback converter 100 would start from a zero condition when next powered on.

To achieve a consistent continuous operating mode, the load must be controlled at the output. When the load is in a light load condition (i.e., the load voltage falls below a predetermined threshold voltage), an auxiliary load is added to the output to force the converter to work continuously. The auxiliary load is removed from the output when the load is in a heavy load condition (i.e., the load voltage is above the predetermined threshold voltage) because when the load voltage is above the predetermined threshold voltage the converted works continuously. By sensing the load voltage across the output and controlling the auxiliary load accordingly, the converter may be maintained in a continuous operating mode.

Figure 4:
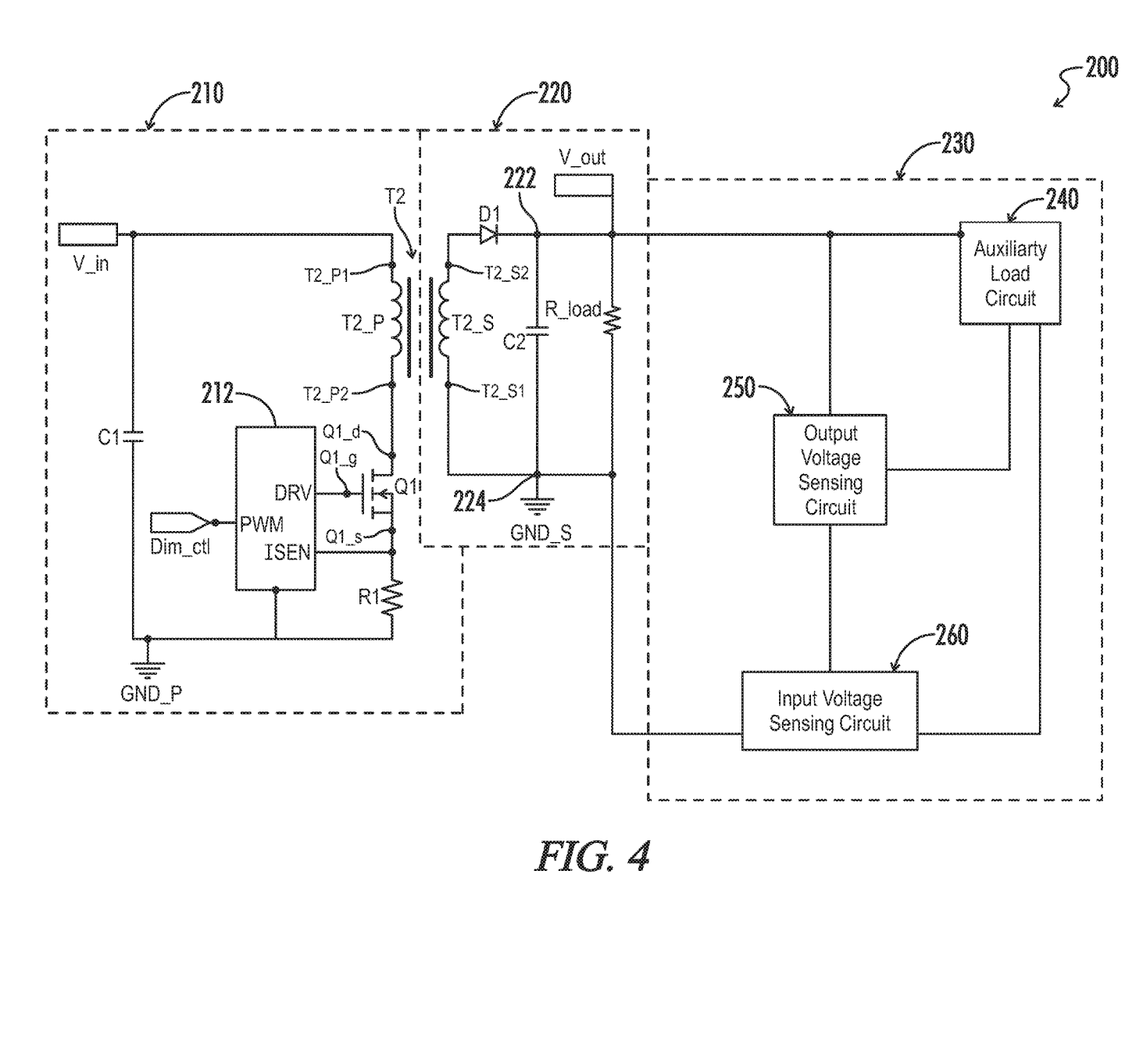
FIG. 4 illustrates an exemplary driver circuit having a load control loop for the flyback converter according to aspects of the present disclosure.
Figure 5:
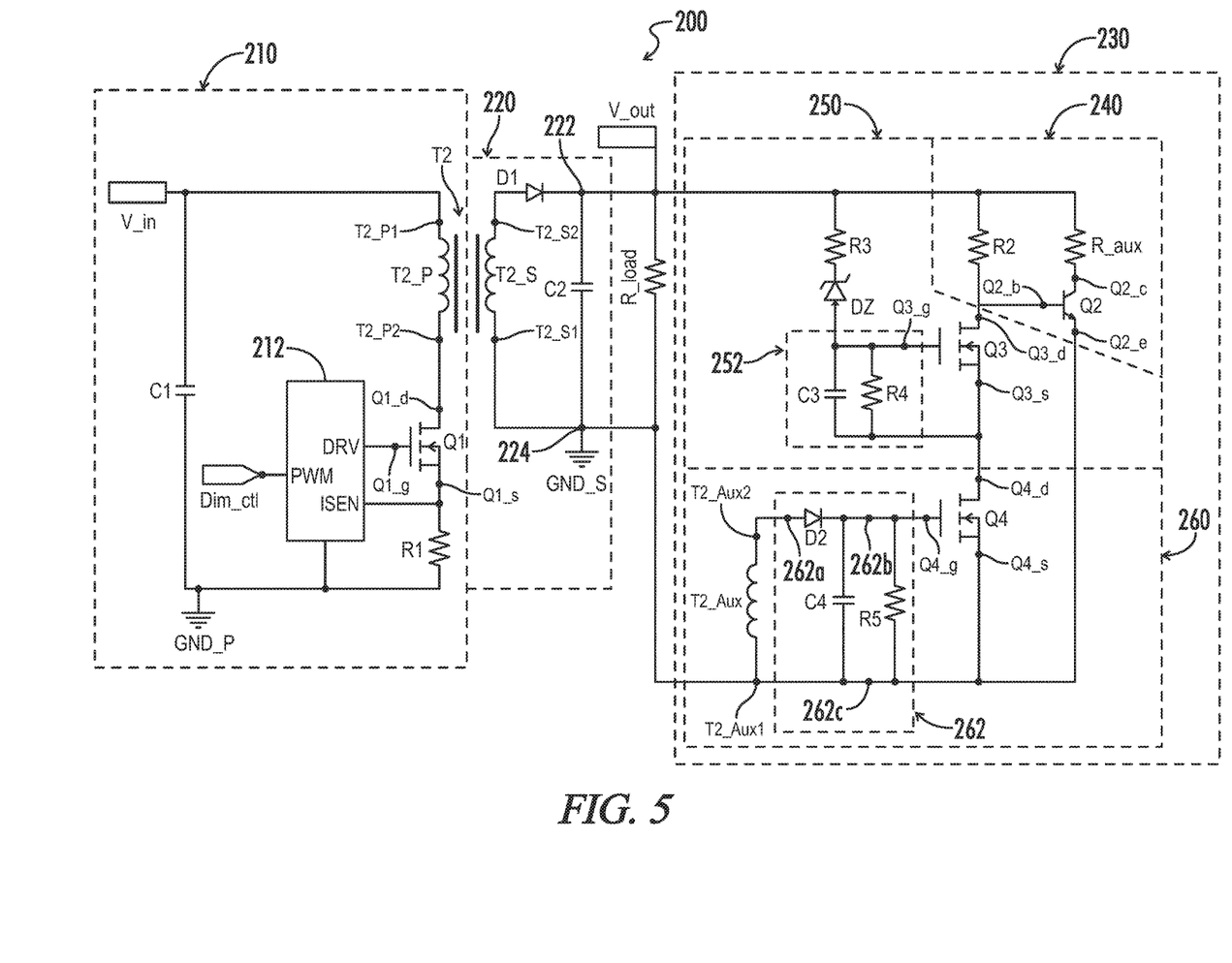
FIG. 5 illustrates an embodiment of the driver circuit of FIG. 4 with detailed circuit elements.

As shown in FIGS. 4 and 5, a load and voltage control circuit is added to the original flyback converter (shown in FIG. 1). The load and voltage control circuit may be referred to as a load control circuit. The load and voltage control circuit includes an auxiliary load that is implemented when the load R_load is light and the output voltage V_out is low. The auxiliary load is connected to a second switch that is driven by a base drive resistor.

The load and voltage control circuit further includes an auxiliary winding from the flyback transformer which is used to sense whether the input voltage V_in is on or off. If the input voltage V_in is on, the constant current control IC will be working and the auxiliary winding will have voltage across it. If the input voltage V_in is off, the flyback transformer T1 will have no voltage across it even when the IC is working. A rectifier is coupled across the auxiliary winding to rectify AC voltage into a DC gate drive voltage signal for controlling a fourth switch. As a result, if the input voltage V_in is on, a capacitor of the rectifier will be charged up and the fourth switch will be on and look like a short circuit to ground.

The load and voltage control circuit further includes an output voltage sensing circuit having a resistor and a Zener diode. The Zener diode has a threshold voltage. When the output voltage V_out is higher than the threshold voltage of the Zener diode, the output buffer capacitor C2 will start to change a capacitor that controls a third switch, thereby causing the third switch to be on. When the output voltage V_out is lower than the threshold voltage, the Zener diode will block current from flowing through it and the third switch will be off.

The load and voltage control circuit has three working states which are summarized as follows: (1) a high load condition, (2) a low load condition, and (3) power off condition.

In the high load condition, the input voltage V_in is on and the output voltage V_out is greater than the threshold voltage. The third and fourth switches are automatically turned on and the second switch is automatically turned off. Due to the second switch being turned off, the auxiliary load to be out of the circuit and avoid extra power losses caused by the auxiliary load.

In the low load condition, the input voltage V_in is on and the output voltage V_out is less than the threshold voltage. The third switch is automatically turned off and the second and fourth switches are automatically turned on. Due to the second switch being turned on, the auxiliary load is automatically part of the circuit to keep the flyback converter working in the continuous mode.

In the power off condition, the input voltage is turned off from the on state and the output voltage V_out is less than the threshold voltage. The third and fourth switches will be automatically turned off and the second switch will be automatically turned on. Due to the second switch being turned on, the auxiliary load is automatically part of the circuit and quickly discharges the output buffer capacitor C2, which is typically quite large (i.e., 470 uF).

In an exemplary embodiment, a drive circuit is provided for providing stability of a wide load range in accordance with the present invention. The drive circuit includes an isolation transformer, a primary side circuit, a secondary side circuit, and a load control circuit. The isolation transformer includes a primary winding and a secondary winding. The primary side circuit is coupled to the primary winding of the isolation transformer. The secondary side circuit is coupled to the secondary winding of the isolation transformer. The secondary side circuit has first and second output terminals for coupling to a primary load. The load control circuit is responsive to a load condition and is configured to selectively apply an auxiliary load across the first and second output terminals. The isolation transformer is maintained in a continuous operating mode.

In certain embodiments, the load control circuit may be configured to apply the auxiliary load across the first and second output terminals when a sensed output voltage falls below a predetermined threshold voltage. The predetermined threshold voltage may be associated with a Zener diode in the load control circuit.

In certain embodiments, the load control circuit comprises an auxiliary load circuit, an output voltage sensing circuit, and an input voltage sensing circuit. The auxiliary load circuit may supplement the load when the load is in a low load condition. The output voltage sensing circuit may sense an output voltage and bypass the auxiliary load circuit when the load is in a high load condition. The input voltage sensing circuit may sense whether the driver circuit is in a power off condition.

In certain embodiments, the auxiliary load circuit may include an auxiliary load resistor, an auxiliary load switch, and an auxiliary drive resistor. The auxiliary load resistor may be connected at a first end to the first output terminal. The auxiliary load switch may have an auxiliary switch collector node, an auxiliary switch base node, and an auxiliary switch emitter node. The auxiliary switch collector node may be connected to a second end of the auxiliary load resistor. The auxiliary switch emitter node may be connected to the second output terminal, the auxiliary drive resistor may be coupled between the first output terminal and the auxiliary switch base node.

In certain embodiments, the input voltage sensing circuit may include a voltage sensing resistor, the Zener diode, a filter, and an output voltage sensing switch. The voltage sensing resistor may be connected at a first end to the first output terminal. The Zener diode may have a Zener voltage defining the predetermined threshold voltage. The Zener diode may be connected in series with the voltage sensing resistor. A cathode of the Zener diode may be connected to a second end of the output voltage sensing resistor. The output voltage sensing switch may have an output voltage switch gate node, an output voltage switch drain node, and an output voltage switch source node. The output voltage switch gate node may be connected to an anode of the Zener diode. The output voltage switch drain node may be connected to the auxiliary switch base node. The filter may be connected between the output voltage switch gate node and the output voltage switch source node. The filter may include a filter resistor and a filter capacitor situated in parallel.

In certain embodiments, the isolation transformer may include an auxiliary winding having a first auxiliary winding terminal and a second auxiliary winding terminal.

In certain embodiments, the input voltage sensing circuit may include the auxiliary winding, a rectifier, and an input voltage sensing switch. The rectifier may have a first rectifier node, a second rectifier node, and a third rectifier node. The input voltage sensing switch may have an input voltage switch gate node, an input voltage switch drain node, and an input voltage switch source node. The first auxiliary winding terminal may be connected to the second output terminal. The second auxiliary winding terminal may be connected to the first rectifier node. The second rectifier node may be connected to the output voltage switch gate node. The third rectifier node may be connected to both the first output terminal and the input voltage switch source node. The input voltage switch drain node may be connected to the output voltage switch source node. The rectifier may include a rectifier diode, a rectifier resistor, and a rectifier capacitor. The rectifier diode may include an anode connected to the first rectifier node and a cathode connected to the second rectifier node. The rectifier resistor and capacitor may be coupled in parallel between the second rectifier node and the third rectifier node.

In certain embodiments, the input voltage sensing switch of the input voltage sensing circuit may be on when the drive circuit is in either the low load condition or high load condition. The low load and high load conditions may correspond to a power on condition.

In certain embodiments, the high load condition may occur when the output voltage is greater than the predetermined threshold voltage. The auxiliary switch may be configured to turn off in the high load condition. The output voltage sensing switch may be configured to turn on in the high load condition.

In certain embodiments, the low load condition may occur when the output voltage is less than the predetermined threshold voltage. The auxiliary switch may be configured to turn on in the low load condition. The output voltage sensing switch may be configured to turn off in the low load condition.

In certain embodiments, the power off condition may occur when the drive circuit is turned off. The auxiliary switch may be configured to turn on in the power off condition. The input and output voltage sensing switches may be configured to turn off in the power off condition.

In certain embodiments, the secondary side circuit may include a secondary output capacitor and a diode. The secondary output capacitor may be coupled between the first and second output terminals. The diode may be coupled between the secondary winding of the isolation transformer and the secondary output capacitor. The secondary filter capacitor may discharge through the auxiliary load in a power off condition.

In another embodiment, an LED illumination fixture is provided in accordance with the present invention. The LED illumination fixture may include an LED driver, a first load, and a load control circuit. The LED driver may comprise a flyback power converter. The first load may include one or more LEDs coupled to an output side of the LED driver. The load control circuit may be coupled to the output side of the LED driver. The load control circuit may be configured to apply an auxiliary load across the first load in response to a sensed output voltage across the first load. The In certain embodiments, the load control circuit may be configured to apply the auxiliary load across the first and second output terminals when a sensed output voltage falls below a predetermined threshold voltage in order to maintain the flyback power converter in the continuous operating mode. The load control circuit may further be configured to short circuit the auxiliary load when a sensed output voltage exceeds the predetermined threshold voltage.

In another embodiment, an LED driver is provided in accordance with the present invention. The LED driver may include a flyback power converter means and an auxiliary load means. The flyback power converter means may be for producing a constant current through a primary load coupled across first and second output terminals. The auxiliary load means may be for maintaining the flyback power converter in a continuous operating mode responsive to an output voltage across the first and second output terminals.

In certain embodiments, the flyback power converter means is maintained in the continuous operating mode. The flyback power converter means may include at least a primary and secondary winding.

In certain embodiments, the auxiliary load means may include a load control circuit having an auxiliary load. The load control circuit may be configured to apply the auxiliary load across the first and second output terminals in response to the output voltage falling below a predetermined threshold voltage for maintaining the flyback power converter means in the continuous operating mode.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 4-5, exemplary light emitting diode (LED) drivers, flyback converter configurations, lighting fixtures, and associated methods are now illustrated in greater detail. Where the various figures may describe embodiments sharing various common elements and features with other embodiments, similar elements and features are given the same or similar reference numerals and redundant description thereof may be omitted below.

FIGS. 4 and 5 illustrate embodiments of an exemplary driver circuit 200 for providing stability of a wide load range for a flyback converter according to aspects of the present disclosure. The driver circuit 200 may be referred to as a drive circuit 200 or an LED driver 200. The driver circuit 200 (e.g., a flyback converter circuit 200) includes a primary side circuit 210, a secondary side circuit 220, and a load control circuit 230. The load control circuit may be referred to as an auxiliary load means 230. The primary side circuit 210 and the secondary side circuit 220 and the load control circuit 230 may be isolated from one another by an isolation transformer T2. The isolation transformer T2 may be referred to as a flyback transformer T2, a flyback converter T2, or flyback power converter means T2. The isolation transformer T2 may include a primary winding T2_P, a secondary winding T2_S, and an auxiliary winding T2_AUX (shown in FIG. 5). Each of the primary winding T2_P, the secondary winding T2_S, and the auxiliary winding T2_AUX have first and second terminals, for example to electronically couple to one or more components of the driver circuit 200. The isolation transformer T2 is configured to produce a constant current through the primary winding T2_P. The isolation transformer T2 is configured to be maintained in a continuous operating mode. The primary side circuit 210 and the secondary side circuit 220 may each have a primary side ground GND_P and a secondary side ground GND_S, respectively.

The primary side circuit 210 includes one or more of: an input voltage source V_in, a first capacitor C1, a constant current control integrated circuit (IC) 212, the primary winding T2_P, a primary switching element Q1, and a first resistor R1. The first capacitor C1 may be referred to as an input filter capacitor C1. The primary switching element Q1 may be referred to as a first switch Q1. The first resistor R1 may be referred to as a current sensing resistor R1. In one exemplary embodiment, the constant current control IC 212 may use a primary sensing technique and for example may be a SY5801 controller from Silergy Company. The input voltage source V_in may be from either an input rectifier diode bridge (not shown) or a power factor correction circuit (not shown). The input voltage source V_in is a direct current (DC) voltage supply. The input voltage source V_in may be connected to a first primary winding terminal T2_P1 of the primary winding T2_P. The input filter capacitor C1 may be coupled between the input voltage source V_in and the primary side ground GND_P.

The first switch Q1 may include a first switch drain node Q1_d, a first switch gate node Q1_g, and a first switch source node Q1_s. A second primary winding terminal T2_P2 of the primary winding T2_P is coupled to the first switch drain node Q1_d. The first switch gate node Q1_g may be coupled to a DRV pin of the constant current control IC 212. The constant current control IC 212 may also control the switch Q1 to force the input current received at the secondary side circuit 220 to follow the input voltage V_in waveform to achieve a high power factor while maintaining target output currents and voltages to maintain the isolation transformer T2 of the driver circuit 200 in a continuous operating mode. The first resistor R1 may be coupled at a first end to both the first switch source node Q1_s and an ISEN pin of the constant current control IC 212. The opposite end of the first resistor R1 is coupled to the primary side ground GND_P. The ISEN pin of the constant current control IC 212 senses the primary current going through the first switch Q1 using the first resistor R1 and controls the current on the secondary side circuit 220. A dimmer control input Dim_ctl may be coupled to a PWM pin of the constant current control IC 212. The dimmer control input Dim_ctl gives a reference output current level. The constant current control IC 212 is responsive to the dimmer control input Dim_ctl to adjust the operating frequency and duty ratio according to an internal algorithm to maintain a constant current output on the secondary side circuit 220.

The secondary side circuit 220 of the driver circuit 200 illustrated in the exemplary embodiment of FIG. 4 includes the secondary winding T2_S, a first diode D1, and a second capacitor C2. The second capacitor C2 may be an output filter capacitor C2. The anode of the diode D1 may be coupled to a second secondary winding terminal T2_S2 of the secondary winding T2_S. A first secondary winding terminal T2_S1 of the secondary winding T2_S may be coupled to the secondary ground GND_S. The cathode of the diode D1 may be coupled to the second capacitor C2 at a first side thereof and may be further coupled to a resistive load R_load external to the secondary side circuit 220. The resistive load R_load may be referred to as a load R_load, a first load R_load, or a primary load R_load. The load R_load may be one or more LEDs in various embodiments. The load R_load may be external to the driver circuit 200, may be a part of the driver circuit 200, or any combination thereof without departing from the spirit and the scope of the present disclosure. The secondary side circuit 220 of the driver circuit 200 may be configured to provide at least one of a controlled load voltage and/or a controlled load current to the load R_load during operation. The second capacitor C2 is coupled at a second side to the secondary side ground GND_S. The secondary side circuit 220 of the driver circuit 200 further includes a first output terminal 222 and a second output terminal 224. The first output terminal 222 is located at the first side of the second capacitor C2. The second output terminal 224 is located at the second side of the second capacitor C2. The second output terminal 224 is at the secondary side ground GND_S.

As shown for example in FIG. 4, a load control circuit 230 may be provided that is configured responsive to a load condition to selectively apply an auxiliary load R_aux across the first and second output terminals 222, 224. The auxiliary load R_aux may be referred to as an auxiliary load resistor R_aux. The load control circuit 230 may in an embodiment apply the auxiliary load R_aux across the first and second output terminals 222, 224 when a sensed output voltage V_out falls below a predetermined threshold voltage associated with a Zener diode DZ of the load control circuit 230. The output voltage V_out is measured across the first and second output terminals 222, 224. The load condition may include a low load condition corresponding to the output voltage V_out being below the predetermined threshold voltage. The load condition may include a high load condition corresponding to the output voltage V_out being higher than the predetermined threshold voltage. The load condition may include a power off condition corresponding to the driver circuit being turned off. The low and high load conditions correspond to an underlying power on condition. The load control circuit 230 includes an auxiliary load circuit 240, an output voltage sensing circuit 250, and an input voltage sensing circuit 260.

The auxiliary load circuit 240 of the load control circuit 230 is configured to supplement the load R_load when in the low load condition. The auxiliary load circuit 240 is also configured to quickly discharge the second capacitor C2 when in the power off condition. As shown in FIG. 5, the auxiliary load circuit 240 includes one or more of: the auxiliary load R_aux, a second switching element Q2, and a second resistor R2. The second resistor R2 may be referred to as an auxiliary drive resistor R2. The second switching element Q2 may be referred to as an auxiliary load switch Q2 or a second switch Q2. The second switch Q2 may have a second switch collector node Q2_c, a second switch base node Q2_b, and a second switch emitter node Q2_e. The second switch collector node Q2_c may be referred to as an auxiliary switch collector node Q2_c. The second switch base node Q2_b may be referred to as an auxiliary switch base node Q2_b. The second switch emitter node Q2_e may be referred to as an auxiliary switch emitter node Q2_e. In an embodiment, each of the switch nodes Q2_c, Q2_b, and Q2_e may be referred to as an auxiliary switch node. The auxiliary load R_aux may be coupled at a first end to the first output terminal 222. The auxiliary load R_aux may be coupled at a second end to the second switch collector node Q2_c. The second switch emitter node Q2_e may be coupled to the second output terminal 224. The second resistor R2 may be coupled between the first output terminal 222 and the second switch base node Q2_b. The second resistor R2 is configured to control the second switch Q2.

In an embodiment, the output voltage sensing circuit 250 of the load control circuit 230 is configured to sense the output voltage V_out and bypass the auxiliary load circuit 240 when the load R_load is in the high load condition. As shown in FIG. 5, the output voltage sensing circuit 250 includes one or more of: a third resistor R3, the Zener diode DZ, a filter 252, and an third switching element Q3. The third switching element Q3 may be referred to as a third switch Q3 or an output voltage sensing switch Q3. The third resistor R3 may be referred to as a voltage sensing resistor R3. The third resistor R3 may be configured to sense the output voltage V_out. The third resistor R3 may be coupled at a first end to the first output terminal 222. The Zener diode DZ may be coupled in series with the third resistor R3. The Zener diode DZ may be selected based on its Zener voltage to define the predetermined threshold voltage. The third resistor R3 may be coupled at a second end to the cathode of the Zener diode DZ. The third switch Q3 may have a third switch drain node Q3_d, a third switch gate node Q3_g, and a third switch source node Q3_s. The third switch drain node Q3_d may be referred to as an output voltage switch drain node Q3_d. The third switch gate node Q3_g may be referred to as an output voltage switch gate node Q3_g. The third switch source node Q3_s may be referred to as an output voltage switch source node Q3_s. The third switch gate node Q3_g may be coupled to the anode of the Zener diode DZ. The third switch drain node Q3_d may be coupled to the second switch base node Q2_b. The filter 252 may be coupled between the third switch gate node Q3_g and the third switch source node Q3_s.

In some embodiments, the filter 252 may include a resistor R4 and a capacitor C3 (as shown in FIG. 5). The resistor R4 may be referred to as a fourth resistor R4 or a filter resistor R4. The capacitor C3 may be referred to as a third capacitor C3 or a filter capacitor C3. The fourth resistor R4 may be in parallel with the third capacitor C3.

The input voltage sensing circuit 260 of the load control circuit 230 is configured to sense whether the drive circuit 200 is in the power off condition and bypass the output voltage sensing circuit 260 when in the power off condition. As shown in FIG. 5, the input voltage sensing circuit 260 includes one or more of: the auxiliary winding T2_AUX, a rectifier 262, and an fourth switching element Q4. The fourth switching element Q4 may be referred to as a fourth switch Q4 or an input voltage sensing switch Q4. The rectifier 262 may include a first rectifier node 262*a*, a second rectifier node 262*b*, and a third rectifier node 262*c*. The fourth switch Q4 may have a fourth switch drain node Q4_d, a fourth switch gate node Q4_g, and a fourth switch source node Q4_s. The fourth switch drain node Q4_d may be referred to as an input voltage switch drain node Q4_d. The fourth switch gate node Q4_g may be referred to as an input voltage switch gate node Q4_g. The fourth switch source node Q4_s may be referred to as an input voltage switch source node Q4_s. A first auxiliary winding terminal T2_AUX1 of the auxiliary winding T2_AUX may be coupled to the second output terminal 224. A second auxiliary winding terminal T2_AUX2 of the auxiliary winding T2_AUX may be coupled to the first rectifier node 262*a*. The second rectifier node 262*b* may be coupled to the fourth switch gate node Q4_g. The third rectifier node 262*c* may be coupled to both the second output terminal 224 and the fourth switch source node Q4_s. The fourth switch drain node Q4_d may be coupled to third switch source node Q3_s. The fourth switch source node Q4_s may be coupled to second switch source node Q2_s.

In some embodiments, the rectifier 262 may include a second diode D2, a fifth resistor R5, and a fourth capacitor C4. The second diode D2 may be referred to as a rectifier diode D2. The fifth resistor R5 may be referred to as a rectifier resistor R5. The fourth capacitor C4 may be referred to as a rectifier capacitor C4. The anode of the second diode D2 may be coupled to the first rectifier node 262a. The cathode of the second diode D2 may be coupled to the second rectifier node 262b. The fifth resistor R5 and fourth capacitor C4 may be coupled in parallel between the second rectifier node 262b and the third rectifier node 262c.

The input voltage sensing switch Q4 of the input voltage sensing circuit 260 is on when the drive circuit is in either the low load condition or the high load condition. The low and high load conditions correspond to the power on condition. The power on condition occurs when the input voltage V_in is active.

The high load condition occurs when the output voltage V_out is greater than the predetermined threshold voltage, which as previously mentioned is determined by the Zener diode DZ. The second switch Q2 is configured to turn off in the high load condition. The third switch Q3 is configured to turn on the high load condition. The output voltage sensing circuit 250 thereby causes the auxiliary load R_aux to be bypassed in the high load condition.

The low load condition occurs when the output voltage V_out is less than the predetermined threshold voltage defined by the Zener diode DZ. The second switch Q2 is configured to turn on in the low load condition. The third switch Q3 is configured to turn off the low load condition. The auxiliary load R_aux thereby supplements the load R_load in the low load condition.

The power off condition occurs when the drive circuit 200 is turned off or the voltage input V_in is deactivated. The second switch Q2 is configured to turn on in the power off condition. The output and input voltage sensing switches Q3, Q4 are configured to turn off the power off condition. The second capacitor C2 may be quickly discharged through the auxiliary load R_aux in the power off condition so that the isolation transformer T2 will start from zero when the voltage input V_in is reactivated.

To facilitate the understanding of the embodiments described herein, a number of terms are defined below. The terms defined herein have meanings as commonly understood by a person of ordinary skill in the areas relevant to the present invention.

Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Thus, although there have been described particular embodiments of a new and useful invention it is not intended that such references be construed as limitations upon the scope of this invention except as set forth in the following claims.

What is claimed is:

1. A drive circuit for providing stability over a wide load range, the drive circuit comprising:
   an isolation transformer including a primary winding and a secondary winding;
   a primary side circuit coupled to the primary winding of the isolation transformer;
   a secondary side circuit coupled to the secondary winding, the secondary side circuit having first and second output terminals for coupling to a primary load; and
   a load control circuit responsive to a load condition and configured to selectively apply an auxiliary load across the first and second output terminals,
   wherein the isolation transformer is maintained in continuous operating mode, and
   wherein the load control circuit comprises
      an auxiliary load circuit for supplementing the load when the load is in a low load condition,
      an output voltage sensing circuit for sensing an output voltage and bypassing the auxiliary load circuit when the load is in a high load condition, and
      an input voltage sensing circuit for sensing whether the drive circuit is in a power off condition.

2. The drive circuit of claim 1, wherein the load control circuit is configured to apply the auxiliary load across the first and second output terminals when a sensed output voltage falls below a predetermined threshold voltage.

3. The drive circuit of claim 2, wherein the predetermined threshold voltage is associated with a Zener diode in the load control circuit.

4. The drive circuit of claim 1, wherein the auxiliary load circuit includes an auxiliary load resistor, an auxiliary load switch, and an auxiliary drive resistor, the auxiliary load resistor connected at a first end to the first output terminal, the auxiliary load switch having an auxiliary switch collector node, an auxiliary switch base node, and an auxiliary switch emitter node, the auxiliary switch collector node connected to a second end of the auxiliary load resistor, the auxiliary switch emitter node connected to the second output terminal, the auxiliary drive resistor coupled between the first output terminal and the auxiliary switch base node.

5. The drive circuit of claim 4, wherein the input voltage sensing circuit includes a voltage sensing resistor, the Zener diode, a filter, and an output voltage sensing switch, the voltage sensing resistor connected at a first end to the first output terminal, the Zener diode having a Zener voltage defining the predetermined threshold voltage, the Zener diode connected in series with the voltage sensing resistor, a cathode of the Zener diode connected to a second end of the output voltage sensing resistor, the output voltage sensing switch having an output voltage switch gate node, an output voltage switch drain node, and an output voltage switch source node, the output voltage switch gate node connected to an anode of the Zener diode, the output voltage switch drain node connected to the auxiliary switch base node, the filter connected between the output voltage switch gate node and the output voltage switch source node.

6. The drive circuit of claim 5, wherein the filter includes a filter resistor and a filter capacitor in parallel.

7. The drive circuit of claim 5, wherein the isolation transformer includes an auxiliary winding having a first auxiliary winding terminal and a second auxiliary winding terminal, and wherein the input voltage sensing circuit includes the auxiliary winding, a rectifier having a first rectifier node, a second rectifier node, and a third rectifier node, and an input voltage sensing switch having an input voltage switch gate node, a input voltage switch drain node, and a input voltage switch source node, the first auxiliary winding terminal connected to the second output terminal, the second auxiliary winding terminal connected to the first rectifier node, the second rectifier node connected to the output voltage switch gate node, the third rectifier node connected to both the first output terminal and the input voltage switch source node, the input voltage switch drain node connected to the output voltage switch source node.

8. The drive circuit of claim 7, wherein the rectifier includes a rectifier diode, a rectifier resistor, and a rectifier capacitor, the rectifier diode including an anode connected to the first rectifier node and a cathode connected to the second rectifier node, the rectifier resistor and capacitor coupled in parallel between the second rectifier node and the third rectifier node.

9. The drive circuit of claim 7, wherein the input voltage sensing switch of the input voltage sensing circuit is on when the drive circuit is in either the low load condition or high load condition, the low load and high load conditions corresponding to a power on condition.

10. The drive circuit of claim 7, wherein the high load condition occurs when the output voltage is greater than the predetermined threshold voltage, the auxiliary switch is configured to turn off in the high load condition, the output voltage sensing switch configured to turn on in the high load condition.

11. The drive circuit of claim 7, wherein the low load condition occurs when the output voltage is less than the predetermined threshold voltage, the auxiliary switch configured to turn on in the low load condition, the output voltage sensing switch configured to turn off in the low load condition.

12. The drive circuit of claim 7, wherein the power off condition occurs when the drive circuit is turned off, the auxiliary switch configured to turn on in the power off condition, the input and output voltage sensing switches configured to turn off in the power off condition.

13. The drive circuit of claim 1, wherein the secondary side circuit includes a secondary output capacitor and a diode, the secondary output capacitor coupled between the first and second output terminals, and the diode coupled between the secondary winding of the isolation transformer and the secondary output capacitor.

14. The drive circuit of claim 13, wherein the secondary filter capacitor discharges through the auxiliary load in a power off condition.

* * * * *